United States Patent [19]

Macin et al.

[11] Patent Number: 4,534,208
[45] Date of Patent: Aug. 13, 1985

[54] METHOD AND APPARATUS FOR TESTING A SEALED CONTAINER

[75] Inventors: Bruce J. Macin, Lauderhill; Mark S. Bresin, Coral Springs, both of Fla.

[73] Assignee: Motorola, Inc., Schaumburg, Ill.

[21] Appl. No.: 550,265

[22] Filed: Nov. 9, 1983

[51] Int. Cl.³ ............................................ G01M 3/26
[52] U.S. Cl. ........................................ 73/49.3; 73/40; 73/52; 179/179
[58] Field of Search .................... 73/493, 52, 45.5, 40, 73/38; 179/179, 178, 184

[56] References Cited

U.S. PATENT DOCUMENTS

| | | | |
|---|---|---|---|
| 1,827,562 | 10/1931 | Carpenter | 73/38 |
| 2,453,192 | 11/1948 | Bryant | 179/179 X |
| 3,251,218 | 5/1966 | Russell | 73/38 |
| 3,391,754 | 7/1968 | Montanaro | 179/184 |
| 3,518,875 | 7/1970 | Charmasson | 73/64.3 |
| 3,789,166 | 1/1974 | Sebesta | 179/179 |
| 3,949,596 | 4/1976 | Hawk | 73/49.1 |
| 3,987,258 | 10/1976 | Tsutsui et al. | 179/179 |
| 4,071,040 | 1/1978 | Moriarty | 179/179 |
| 4,089,208 | 5/1978 | Franks et al. | 73/45.5 |

FOREIGN PATENT DOCUMENTS

| | | | |
|---|---|---|---|
| 2310255 | 11/1973 | Fed. Rep. of Germany | 73/38 |
| 158530 | 12/1980 | Japan | 73/40 |
| 750346 | 7/1980 | U.S.S.R. | 73/38 |

Primary Examiner—Stewart J. Levy
Assistant Examiner—Hezron Williams
Attorney, Agent, or Firm—Joseph T. Downey; Edward M. Roney; Donald B. Southard

[57] ABSTRACT

A sealed container having a test port with a membrane which is pervious to gas and impervious to liquid may be tested by connecting a pressure device such as a vacuum pump or pressure pump to the test port and creating a pressure differential between the container side of the membrane and the pump side of the membrane, allowing the pressure differential to equalize through the membrane and monitoring the equalized pressure to detect whether or not the equalized pressure changes, which utilmately allows the observer to determine whether the sealed container has any leaks. If the pressure equalization time is substantially zero, the membrane and/or membrane seal is defective. In the event a leak is determined, the inside of the radio device may be pressurized to a selected pressure, by use of a pressure pump or the like, and then immersed in a liquid such as water. The location of the leak may then be detected by observing the emanation of air bubbles from that portion of the device in which the leak exists.

9 Claims, 3 Drawing Figures

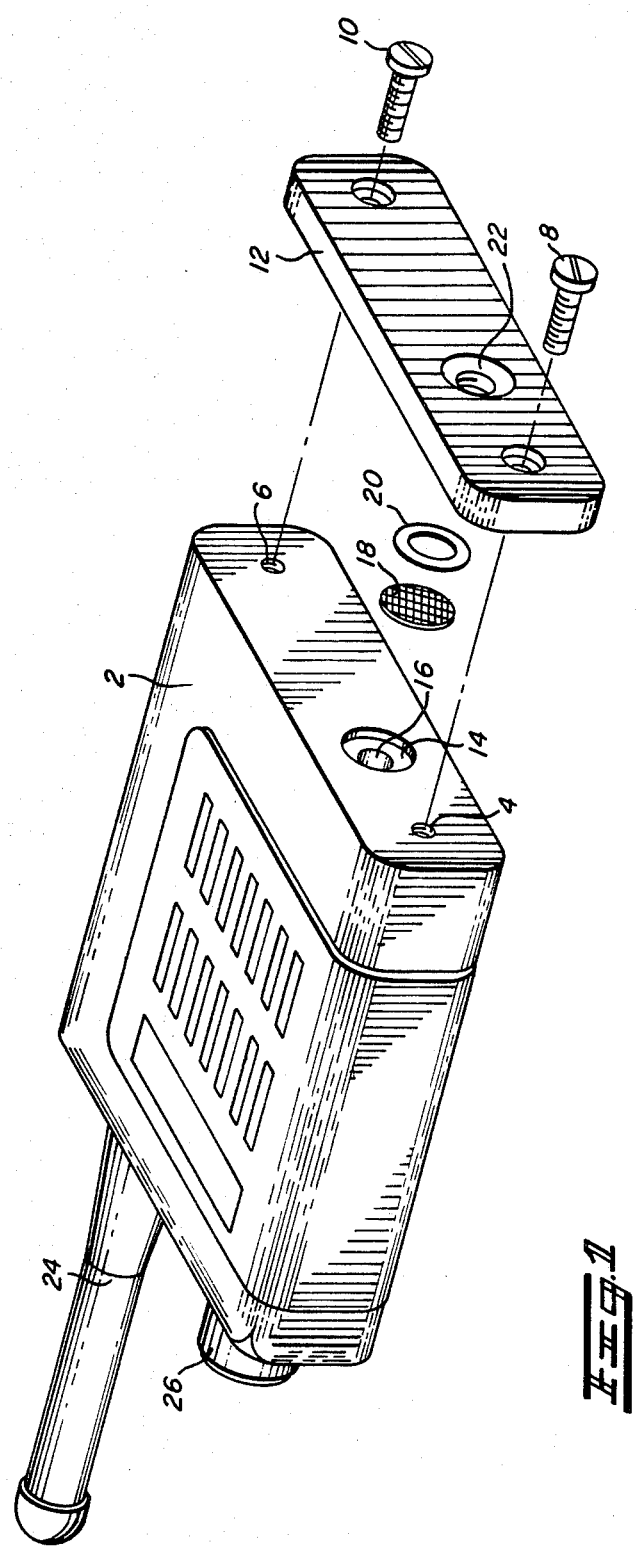

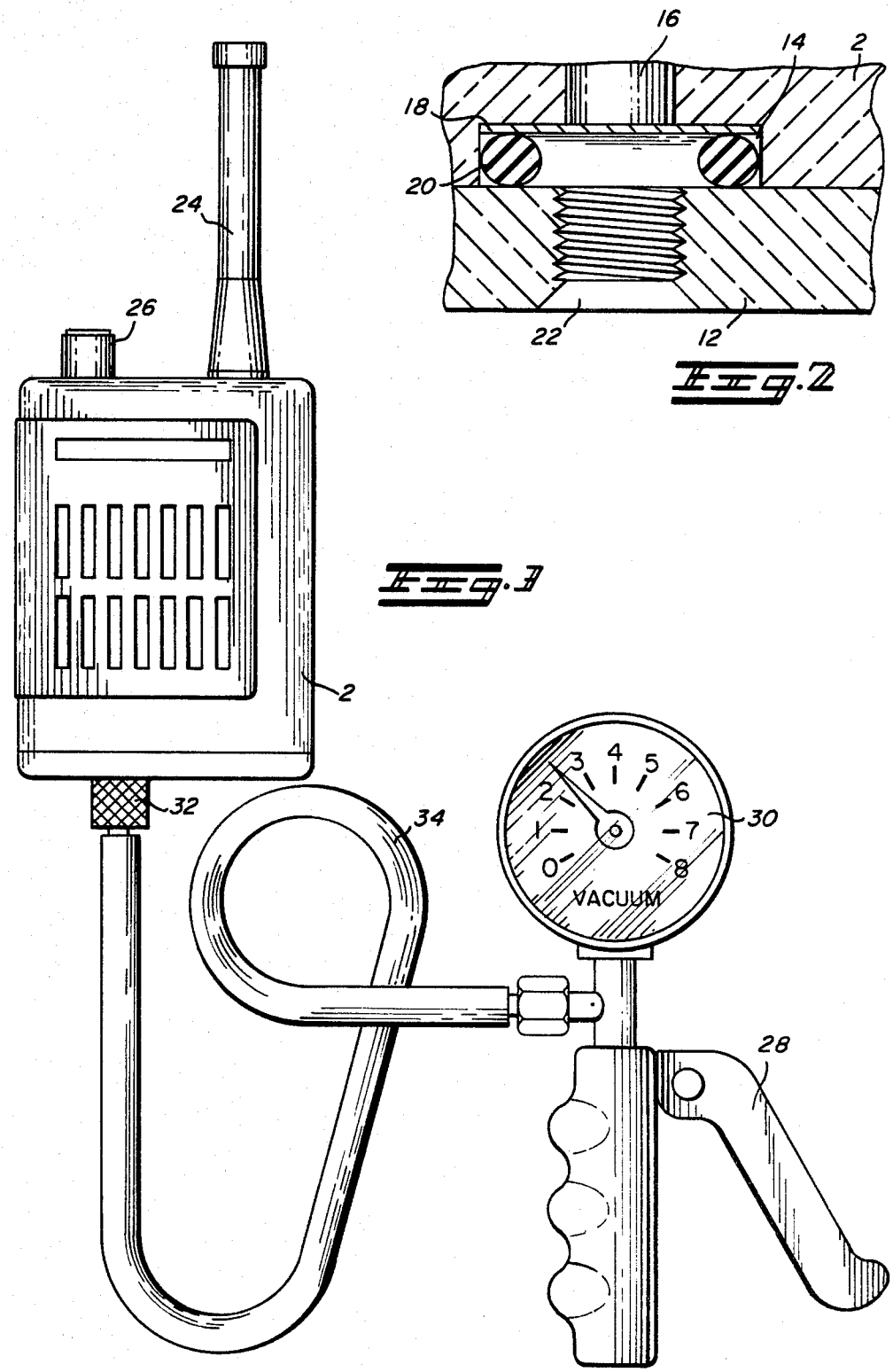

METHOD AND APPARATUS FOR TESTING A SEALED CONTAINER

BACKGROUND OF THE INVENTION

1. Field of the Invention

The present invention relates to methods and apparatus for testing sealed containers and more particularly to a method and apparatus for testing a sealed container having a test port including a membrane which is pervious to gas but impervious to water.

2. Description of the Prior Art

In the past, there have been various methods to test the seal integrity of different devices which were designed to be hermetically sealed. In one such device, the formation of a hermetic seal in an assembly resulting from the connection or incapsulation of one or more substrates such as cables by one or more dimensionally recoverable covering members such as heat recoverable sleeves is tested by detecting the increase in the air pressure which occurs during heating of the assembly once the hermetic seal has been made. This is done by providing an aperture in the covering member which communicates with a detection device such as a balloon or a manometer and with a space within the assembly in which there is a build up of air pressure. Therefore, the integrity of the hermetic seal may be tested by observing the balloon to insure that it remains inflated from the air pressure.

Another process for testing the hermetic seal between a substrate and the cover member, includes the formation upon heating of a desired hermetic seal between the substrate and the covering member which is tested by using a device which can detect the excess air pressure which, once the hermetic seal has been made, builds up within a space between the covering member and the substrate. The preferred means for doing this is by use of a probe which passes between the covering member and the substrate into the space and which is connected to a pressure sensitive device such as a balloon or manometer. After use, the probe, which is preferrably made from a plastic material such as nylon can be fused or deformed to insure that the hermetic seal remains intact.

However, the aforementioned prior art methods both require the penetration of the sealed device either by use of a probe or by the use of an aperture which must be closed and sealed after the device has been tested for the hermetic seal. Therefore, the seal integrity of the test aperture or test probe is never known unless some type of secondary test performed to establish the integrity of the test aperture or probe. They may thus prove to be destructive tests.

Another prior art device comprises a waterproof sound apparatus which includes a sealed cabinet filter means attached to the cabinet which is permeable to gases and impermeable to liquids, a speaker attached to the cabinet which has a waterproof construction, and a grill covering in front of the speaker. The cabinet filter means is apparently used to allow equalization of pressure between the pressure on the outside of the cabinet and the inside of the cabinet, and to prevent the introduction of water into the inside of the cabinet. This art is silent with respect to any methods and apparatus for testing the seal integrity of the device.

It is further obvious to those skilled in the art that one method of testing the seal integrity of a sealed container would be simply to submerge the device in some type of liquid solution and then check to see if any of the liquid had leaked into the inside of the container. However, with devices which contain expensive electronic components therein, the introduction of liquid to the inside of the container may have destructive effects on the sensitive electronic components and therefore render the test procedure very expensive and inefficient.

The present invention enables the seal integrity of a closed container to be checked without allowing the introduction of any liquid into the inside of the housing and therefore in situations where the container contains, for example, expensive electronic components inside, would enable any leaks to be detected without destroying any of the electronic components therein. Further, since the test port of the device includes a membrane which is pervious to gas but impervious to water, a successful completion of the test procedure also indicates that the area around the test port is sealed as well as the membrane itself being waterproof, and therefore the necessity of any secondary testing is eliminated to determine the integrity of the test port and any doubt with respect to the integrity of the seal around the test port is eliminated.

SUMMARY OF THE INVENTION

Accordingly, one object of this invention is to provide a novel non-destructive test procedure for determining the seal integrity of a sealed container including a test port having a sealed membrane which is pervious to gas, but impervious to water.

Another object of the present invention is to provide a novel test procedure for testing the seal integrity of a sealed container in which it is not necessary to close and seal the test port upon completion of the test procedure.

It is yet another object of the present invention to provide a novel test procedure for a sealed container in which the integrity of all of the sealed portions of the container can be tested with a single test procedure.

It is still another object of the present invention to provide an efficient, economical system for non-destructively testing the seal integrity of a sealed container.

In the preferred embodiment, the test procedure is used to non-destructively test the seal integrity of the various seals used in conjunction with the various components of a portable two-way hand-held radio device which also includes a test port having a sealed membrane which is impervious to liquid, yet pervious to gas. The test procedure includes, in the preferred embodiment, the steps of connecting a pressure device such as a vacuum pump to the test port, creating a pressure differential between the container side of the membrane and the pump side of the membrane, allowing the pressure differential to equalize through the membrane and monitoring the equalized pressure to detect whether or not the equalized pressure changes, which ultimately allows the observer to determine whether the sealed container has any leaks. If the pressure equalization time is substantially equal to zero, defective membrane and/or membrane seal is indicated.

In the event a leak is determined, in the preferred embodiment the inside of the radio device may be pressurized to a selected pressure, by use of a pressure pump or the like, and then immersed in a liquid such as water. The location of the leak may then be detected by observing the emanation of air bubbles from that portion of the device in which the leak exists.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an exploded view of a radio device including the test port for the testing procedure of the present invention;

FIG. 2 is a partial cross-sectional view illustrating the sealing details of the test port used for the testing procedure of the present invention;

FIG. 3 is a perspective view of the preferred embodiment of the test system according to the present invention.

DESCRIPTION OF THE PREFERRED EMBODIMENTS

Referring now to the drawings, wherein like reference numerals designate identical or corresponding parts throughout the several views, and more particularly to FIG. 1 thereof, the sealed container, preferably a radio housing 2 of a radio device such as an "EXPO" SERIES submersible portable two-way radio manufactured by Motorola, Inc. is illustrated. The radio housing 2 includes the two threaded apertures 4 and 6 for receiving screws 8 and 10 which are used to fasten the base plate 12 to the radio housing 2. The radio housing 2 also includes the counterbore 14 having a central aperture 16. The counterbore 14 is designed to receive the membrane 18 such as the product which is pervious to gas, but impervious to water sold under the trademark GORE-TEX, which is manufactured by W. L. Gore and Associates, Inc. The membrane 18 is sealed against the bottom surface of the counterbore 14 by the O-ring 20 which is compressed by the base plate 12 as shown more clearly in FIG. 2. The base plate 12 includes the threaded test port 22 which is designed to receive a pressure device such as a vacuum pump or pressure pump. It should be noted that the radio device such as the "EXPO" SERIES submersible portable two-way radio also includes an antenna 24, a volume control knob 26 and speaker (not shown), all of which are sealingly connected to the device in a manner well known to those skilled in the art and therefore a detailed description of their connections is ommitted. It also should be noted that all seals of the radio device, including the O-ring 20 which seals the membrane 18 against the base plate 12 and counterbore 14, are required to be hermetic in order to pass the test procedure. This is based on the presumption that if the seals prove to be hermetic, they will also prevent the intrusion of water providing the radio device is operated within the prescribed pressure ranges.

Now referring to FIG. 3, in the preferred embodiment the seal integrity test for the radio device is performed using a vacuum pump 28 and a vacuum gauge 30, such as the Mity-Vac manufactured by Neward Enterprises, Inc., combination which is connected by way of the adapter 32 and hose 34 to the test port 22 in the base plate 12. The vacuum pump 28 is then operated to create a low pressure condition on the outside (gauge side of the membrane 18) of the radio housing 2, which results in the creation of a lower pressure on the inside (container side of the membrane 18) of the radio housing 2 after the pressure is equalized across the membrane 18. The gauge provides a vacuum pressure reading for the outside (gauge side of membrane 18) of the test port 22; i.e. checking for a properly sealed, water tight unit. More specifically, the vacuum test is performed as follows:

(1) Attach the vacuum hose 34 to the vacuum pump 28 and check the pump 28 and hose 34 for leaks by blocking up the opened end of the hose 34 and operating the pump 28 a few times. The actual reading of the gauge 30 at this point is not important, but it is important that the gauge pointer remain steady indicating no vacuum leaks in the pump 28 or hose 34.

(2) Screw the adapter 32 (such as Motorola Part No. NTN 4264A) into the threaded test port 22 making sure that the rubber gasket (not shown) which is included with the adapter 32 is attached to the adapter 32 to insure proper sealing.

(3) Attach the open end of the hose 34 to the adapter 32.

(4) Operate the pump 28 a few times until the vacuum gauge 30 indicates the equivalent vacuum pressure of five inches of Hg. The gauge should indicate an initial leak down and should then stabilize at some lower value. This leak-down is normal and important and indicates that the pressure is equalizing across the membrane 18. Operate the pump again until the gauge indicates five inches Hg. Some additional leak-down will occur. Repeat this action until the gauge is stabilized at five inches Hg. If stabilization at five inches Hg. cannot be attained, the vacuum test failed and further testing is required.

(5) Observe the gauge for approximately two minutes. If the gauge reading remains constant, then the radio is approved for submersability within the prescribed pressure ranges. If the gauge reading does not remain constant (vacuum test failed), then the radio housing 2 might leak if submerged. Further testing and/or repair may then be required.

(6) Remove the vacuum hose and adapter from the radio.

In the event that the radio housing 2 has failed the vacuum test, pressure testing of the radio is then necessary. The pressure testing involves creating a pressure condition inside the radio, submersing the radio in water, and observing the radio for a stream of bubbles which indicates the location of the leak (such as around the antenna 24 connection area or volume control knob 26 connection area). Since all seal areas of the radio are being checked, the entire unit must be carefully observed for the possibility of multiple leaks before completing this test. A pressure pump such as Motorola Part No. NTN 4265A is required for this test, along with the Motorola Adaptor Part No. NTN 4264A with gasket. The pressure test is performed as follows:

(1) The adapter 32 (with gasket) is screwed into the test port 22.

(2) One end of the pressure hose 34 is connected to the adapter 32 and the other end to the pressure pump (not shown).

(3) The pump (not shown) is operated until the gauge reads approximately 1 PSIG. Some leak-down is normal as the pressure equalizes across the membrane 18.

(4) Maintain the pressure at 1 PSIG, and immerse the radio into a water-filled container.

(5) Watch for any continuous series of bubbles.

(6) Note all of the seal areas that show signs of leakage.

(7) Remove the radio from the water container and thoroughly dry it off.

(8) Remove the adapter 32 and pressure hose 34 from the test port 22.

(9) Replace any of the faulty seals discovered by the test.

It should also be noted that a pressure test could be performed in place of the vacuum test. In this case, since the membrane 18 represents an obstruction to the passage of the gas into the radio housing 2, a time delay exists between the time of application of the pressure and the time when the pressure at the gauge side of the membrane 18 will equalize across the membrane 18 to the container side of the membrane 18. As equalization occurs (one or two seconds) the gauge shows a decreasing pressure (a leak-down). When equalization occurs the gauge ceases to change. The gauge will however indicate a value higher than it did before the application of the pressure. This process is repeated several times until the correct internal container pressure is achieved. A steady gauge indication following the equalization across the membrane 18 for a specified period of time will assure a properly sealed container.

It should be noted that if the membrane 18 is missing or damaged, the entrance of liquid through it would not be prevented. This however, would be clearly indicated by a lack of the leak-down effect after the initial pressurization. If the gasket was not properly seated or damaged this would also be clearly indicated by the inability to maintain a constant internal pressure after sufficient applications of pressure were applied to the housing 2 as to be certain that leak-down is no longer solely due to pressure equalization across the membrane 18. Thus, the seal of the membrane 18 in the counterbore 14 is tested simultaneously with the integrity of the other areas of the radio housing 2 which have particular seals.

It should be readily apparent to those skilled in the art that the radio housing 2 is not totally hermetically sealed from the atmosphere once the test procedure is completed and the adapter 32 is removed. This is because even though the membrane 18 is hermetically sealed within the counterbore 14 itself, the membrane 18 is pervious to gas and will allow the gas pressure on the inside of the radio housing 2 to equalize with respect to the ambient gas pressure on the outside of the radio housing 2.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of non-destructively testing the integrity of an entire sealed container having a test port including a fixed sealed membrane which is pervious to gas and impervious to liquid, comprising the steps of:
   non-destructively creating a pressure differential between the gas on the container side of said fixed membrane and the gas on the other side of said fixed membrane;
   monitoring the rate of pressure equalization to determine the integrity of said fixed membrane;
   allowing said pressure differential to equalize through said fixed membrane;
   monitoring said equalized pressure to detect whether or not said equalized pressure changes.

2. A method, according to claim 1, further comprising the step of:
   determining the location of a leak, in the event said equalized pressure changes.

3. A method, according to claim 2, wherein said step of determining the location of a leak further comprises the steps of:
   non-destructively pressurizing the inside of said sealed container and submerging said sealed container in a liquid to detect the location of a leak in said container in the event said equalized pressure changes.

4. A method, according to claim 1, wherein said step of creating a pressure differential further comprises the steps of:
   sealingly connecting a pressure device having pressure indicating means to said test port and operating said pressure device to create said pressure differential.

5. A method, according to claim 3, wherein said step of monitoring said equalized pressure further comprises the step of:
   observing said pressure indicating means.

6. A system for non-destructively testing the integrity of an entire sealed container, comprising:
   said sealed container including a test port having a fixed sealed membrane which is pervious to gas and impervious to liquid, said test port further having a connecting means;
   a pressure means, connectable to said connecting means, for non-destructively creating a pressure differential between the container side of said fixed membrane and the pressure means side of said fixed membrane and for monitoring the pressure on the pressure means side of said fixed membrane to determine the integrity of said fixed membrane and said sealed container.

7. A system, according to claim 6, further comprising:
   detecting means, in communication with said sealed container, for detecting the location of a leak, in the event a leak is indicated by said pressure means.

8. A system, according to claim 6, wherein said pressure means comprises:
   a vacuum pump having an adapter means connectable to said connecting meeans; and
   a vacuum gauge, operably connected to said vacuum pump, for indicating the pressure on the vacuum pump side of said fixed membrane.

9. A system, according to claim 6, wherein said pressure means comprises:
   a pressure pump having an adapter means connectable to said connecting means; and
   a pressure gauge, operably connected to said pressure pump, for indicating the pressure on the pressure pump side of said fixed membrane.

* * * * *